(12) United States Patent
Sokhey

(10) Patent No.: US 8,128,347 B2
(45) Date of Patent: Mar. 6, 2012

(54) AEROENGINE BLEED VALVE

(75) Inventor: Jagdish S. Sokhey, Indianapolis, IN (US)

(73) Assignee: Rolls-Royce PLC, London (GB)

( * ) Notice: Subject to any disclaimer, the term of this patent is extended or adjusted under 35 U.S.C. 154(b) by 1197 days.

(21) Appl. No.: 11/878,542

(22) Filed: Jul. 25, 2007

(65) Prior Publication Data
US 2008/0050218 A1 Feb. 28, 2008

(30) Foreign Application Priority Data

Aug. 25, 2006 (GB) .................................. 0616847.0

(51) Int. Cl.
*F01D 17/00* (2006.01)
(52) U.S. Cl. ...................... 415/144; 415/169.1; 415/175
(58) Field of Classification Search .................. 415/144, 415/145, 168.1, 169.1, 175; 60/795, 785
See application file for complete search history.

(56) References Cited

U.S. PATENT DOCUMENTS

| 4,479,755 | A | 10/1984 | Skoe |
| 4,537,277 | A * | 8/1985 | Bryce ............................ 181/214 |
| 6,447,241 | B2 * | 9/2002 | Nakao ............................... 415/1 |
| 6,588,195 | B2 * | 7/2003 | Negulescu ...................... 60/785 |
| 7,921,652 | B2 * | 4/2011 | Kirby .............................. 60/782 |
| 2001/0042368 | A1 | 11/2001 | Negulescu |
| 2006/0182623 | A1 | 8/2006 | Touyeras |

FOREIGN PATENT DOCUMENTS

| EP | 1 300 567 A3 | 4/2003 |
| GB | 867849 | 5/1961 |
| GB | 2 132 269 A | 7/1984 |
| GB | 2 405 666 A | 3/2005 |
| JP | A 59-168296 | 9/1984 |

* cited by examiner

*Primary Examiner* — Edward Look
*Assistant Examiner* — Ryan Ellis
(74) *Attorney, Agent, or Firm* — Oliff & Berridge, PLC

(57) ABSTRACT

A bleed valve for a gas turbine engine, the valve comprises a diffuser having a plurality of holes through which a bleed fluid flows and into a fluid stream. The diffuser is characterized in that at least some of the holes are at least partially tangentially angled relative to the bleed fluid flow through the valve so that the bleed air forms a vortex to enhance mixing with the fluid stream.

13 Claims, 5 Drawing Sheets

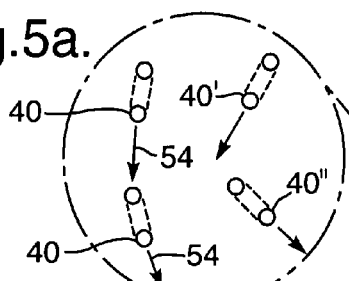
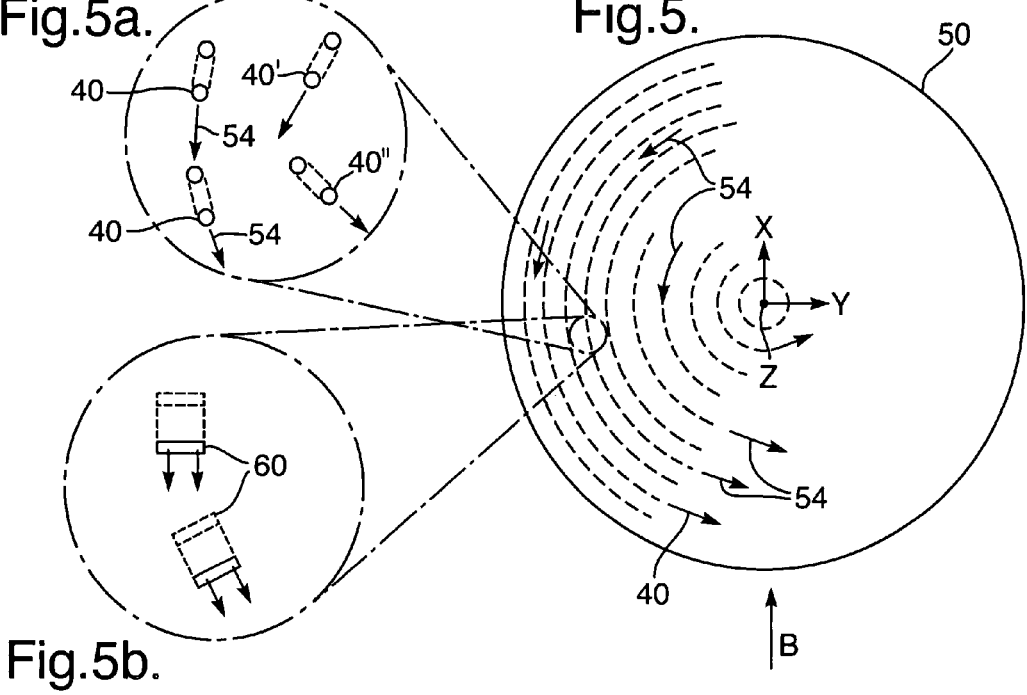
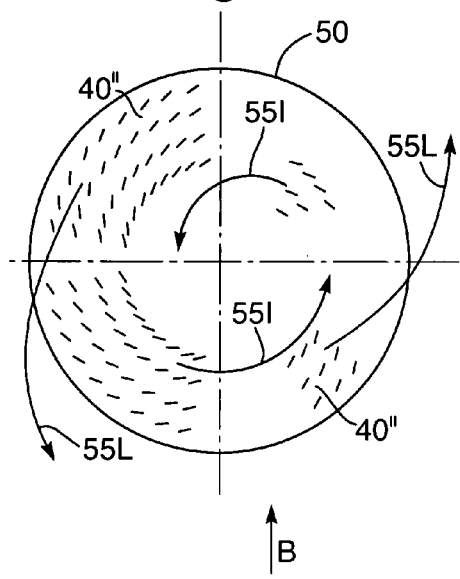
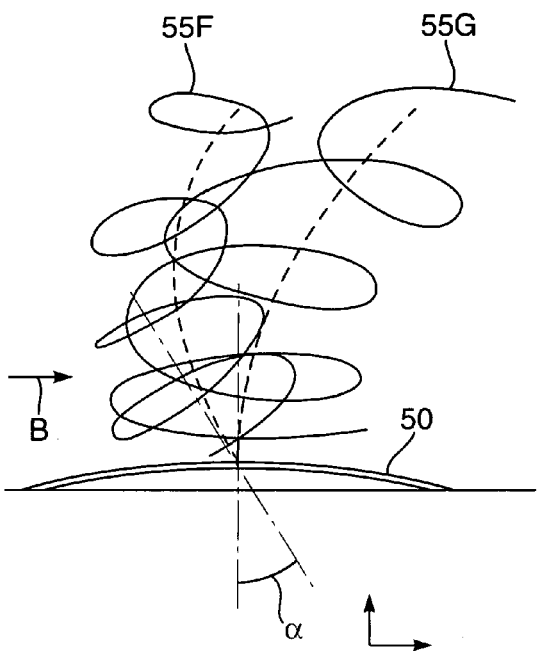

AEROENGINE BLEED VALVE

The present invention relates to a bleed valve assembly for a gas turbine engine and particularly but not exclusively for releasing compressed air from a compressor into a bypass duct of the engine.

BACKGROUND

The use and configuration of bleed valves are well known in gas turbine engines and are usually used to improve engine operability particularly for the engine's compressors. In use heated air at high pressure passes from a compressor, through a bleed valve and via a diffuser into a main gas stream, such as the relatively cool bypass flow. The compressor may be either an intermediate or high pressure compressor and exhausted bled gas temperatures may be up to 400° C.

Known bleed valve diffusers, such as installed on the Trent 500 aeroengine of Rolls-Royce™ plc, are designed with the intent to a) attenuate noise produced within the bleed valve; b) produce small separate jets of bleed air (rather than one large one) to increase the jets noise frequency, which is better attenuated within the bypass duct and atmosphere; and c) improve mixing of the hot gases flowing through the bleed valve with the cold bypass flow in order to limit/prevent thermal damage to nacelle and other components.

These diffusers are usually circular domes and have an array of holes where each hole is angled radially so that its air flow jet has both radial and axial velocity components relative to the diffuser's centre-line. Some diffusers, like the Trent 500's, have a number of zones of holes where each zone's holes are angled differently from other zones in the axial direction relative to the centre-line. This difference in axial angle between zones is intended to enhance the mixing of the hot gas passing through the diffuser with the cool bypass flow to reduce its temperature before impinging on thermally sensitive nacelle and/or engine parts. However, it has been found that these prior art diffusers are ineffective because the individual flows from each small hole do not act independently. Although each small gas stream is initially discrete and is directed in a slightly different direction, within a short distance they conglomerate into a single plume. This is because the bypass flow is unable to achieve significant penetration into the mass of individual plumes and so a partial vacuum forms between them. This vacuum causes the plumes to turn until they are pointing in the same direction and thus forming a single plume entity.

Increasing the number of bleed valve assemblies could improve mixing overall, however, this adds significant weight, cost and takes up more space. Increasing the size of the bleed valve and diffuser reduces the velocity of the same amount of bleed flow, but the larger bleed flow plume is less well mixed with the bypass stream and more likely to impinge on heat sensitive components.

SUMMARY

Therefore it is an object of the present invention to provide a diffuser for a bleed valve arranged to improve mixing between hot gases passing therethrough and a main air flow it is vented into.

In accordance with the present invention a bleed valve for a gas turbine engine, the valve comprises a diffuser having a plurality of holes through which a bleed fluid flows and into a fluid stream, the diffuser is characterised in that at least some of the holes are at least partially tangentially angled relative to the bleed fluid flow through the valve so that the bleed air forms a vortex to enhance mixing with the fluid stream.

Preferably, all the holes are tangentially angled or at least partially tangentially angled.

Preferably, the holes are also angled radially outwardly to produce a loose vortex.

Alternatively the holes are also angled radially inwardly to produce a tight vortex.

The diffuser may comprise at least two zones wherein one zone comprises the plurality of holes that create the vortex and another zone comprises a plurality of holes that do not create a vortex.

The diffuser may comprise three zones, the vortex-creating zone is positioned generally between the other zones.

Alternatively, the diffuser comprises three zones, two of which are vortex-creating zones and are positioned generally either side of the other zone.

Preferably, the three zones are aligned substantially normal to the direction of fluid stream.

Alternatively, the holes are also angled upstream into the fluid stream to give the vortex or other bleed plume an upstream velocity component.

Preferably, the holes are angled to produce a vortex that rotates in the same direction as any swirl in the fluid stream.

Alternatively, the holes of one of the vortex-creating zones are angled anti-clockwise and the other clockwise to produce corresponding and oppositely rotating vortices.

Preferably, the holes are configured in any one of the group of shapes comprising a circle, an ellipse or a rectangle.

BRIEF DESCRIPTION OF THE DRAWINGS

The present invention will be more fully described by way of example with reference to the accompanying drawings in which:

FIG. 5 is a plan view of a first diffuser comprising arrays of holes arranged to generate a vortex in accordance with the present invention, FIGS. 5a and 5b show a number of different arrangements of holes to FIG. 5 and in accordance with the present invention, FIG. 6 shows an alternative of the FIG. 5 diffuser, FIG. 7 shows vortex plumes exiting the diffuser of the present invention.

DETAILED DESCRIPTION OF THE EMBODIMENTS

Figure 1:
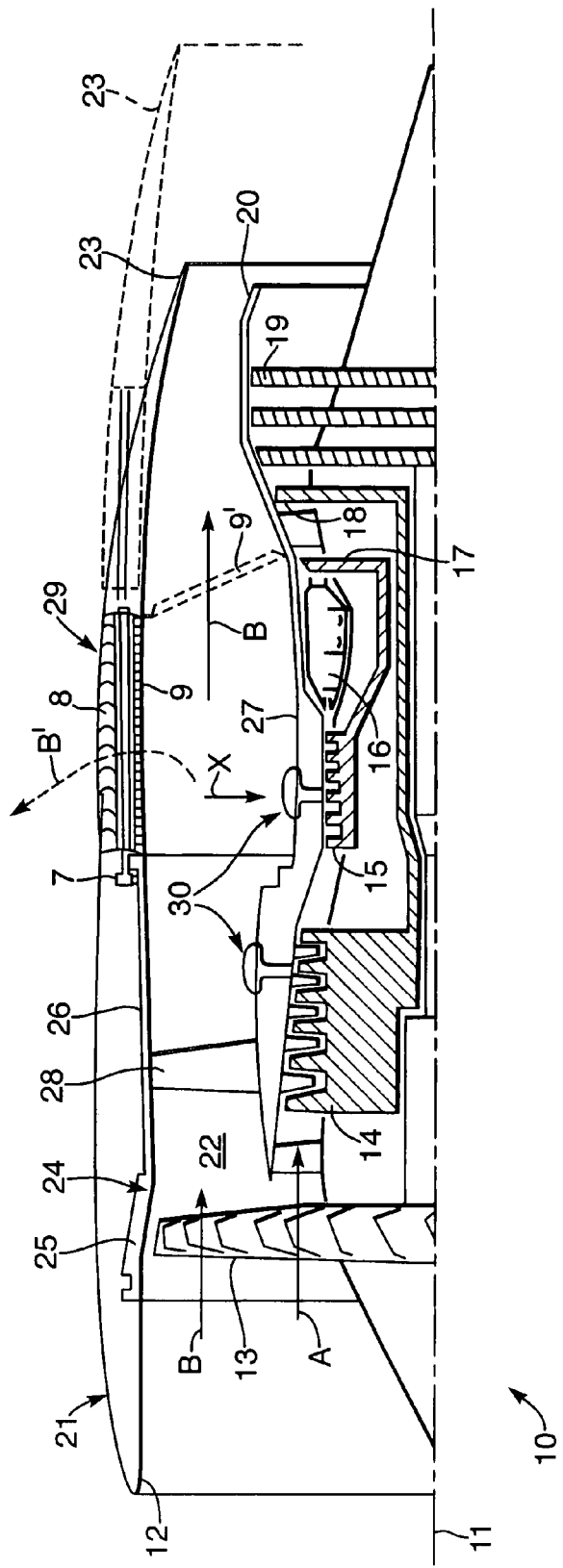
FIG. 1 is a schematic section of part of a ducted fan gas turbine engine and showing typical locations of bleed valves.

Referring to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 11 is accelerated by the fan 13 to produce two air flows: a first airflow A into the intermediate pressure compressor 14 and a second airflow B which passes through the bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The fan 13 is circumferentially surrounded by a structural member in the form of a fan casing 24, which is supported by an annular array of outlet guide vanes 28. The fan casing 24 comprises a rigid containment casing 25 and attached rearwardly thereto is a rear fan casing 26. A thrust reverser unit (TRU) 29 is attached to the rear fan casing 26. The TRU 29 includes a number of actuator mechanisms 7, cascade structure 8 and blocker doors 9. In operation the actuators 7 translates the rear of the nacelle 23 into the position indicated by the dashed line 23', in doing so the blocker doors 9 are arranged to swing down and block the bypass duct 22, thereby directing the bypass airflow B through the cascade structures 8. The air is further turned by vanes in the cascade structure 8 thereby producing reverse thrust to brake the aircraft. The TRU 29 components may be made from lightweight composites or the like and are heat sensitive.

During engine operations and particularly when changing rotational speed at low power it is important to ensure that the pressure ratio across each compressor 14, remains below a critical working point, otherwise the engine 10 can surge and flow through the engine 10 breaks down. This can cause damage to engine's components as well as aircraft handling problems.

To maintain a preferred pressure difference across a compressor 14, 15, or even just one stage of a compressor 14, 15, bleed assemblies 30 are provided to release pressure from an upstream part of a compressor 14, 15. Operation of a bleed assembly 30 and engine operability are described, for example, in "The Jet Engine" 5$^{th}$ Edition, 1986, Rolls-Royce™ plc, pages 28-32, and details of such operation will therefore only be briefly mentioned herein.

Figure 2:
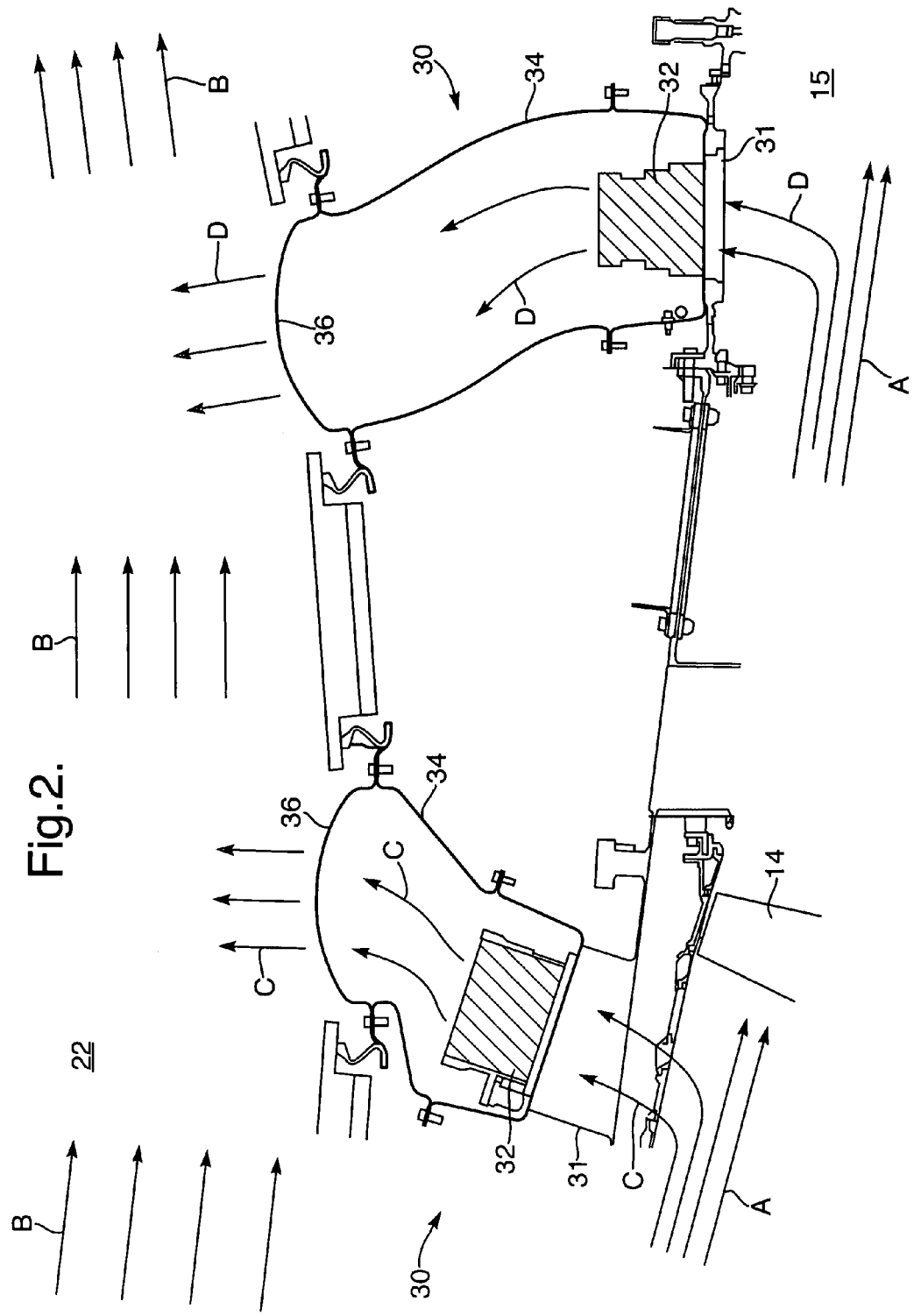
FIG. 2 is a section through part of a gas turbine engine showing a typical bleed valve assembly.

Briefly FIG. 2 shows bleed assemblies 30 associated with the intermediate pressure compressor 14 and high pressure compressor 15. Each bleed assembly 30 comprises an inlet 31 and a bleed valve 32, a duct 34 and a diffuser 36. Parts of core engine airflow A, airflows C and D, may be diverted through the IP and HP bleed assemblies 30, such that each airflow C, D enters the inlet 31, passes through the bleed valve 32 and is channelled by the duct 34 to the diffuser 36. Airflows C and D are then exhausted into the bypass duct 22 where they mix with bypass airflow B as hereinbefore described. There is usually an annular array of bleed valves around the core engine's casing 27.

Figure 3:
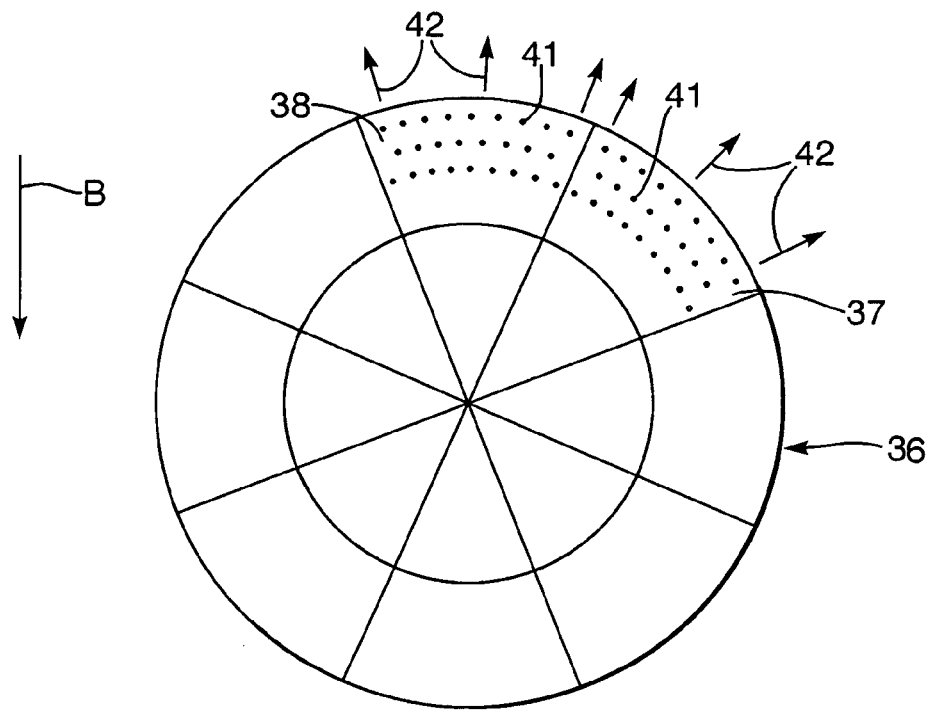
FIG. 3 is a plan view of a prior art bleed valve.
Figure 4:
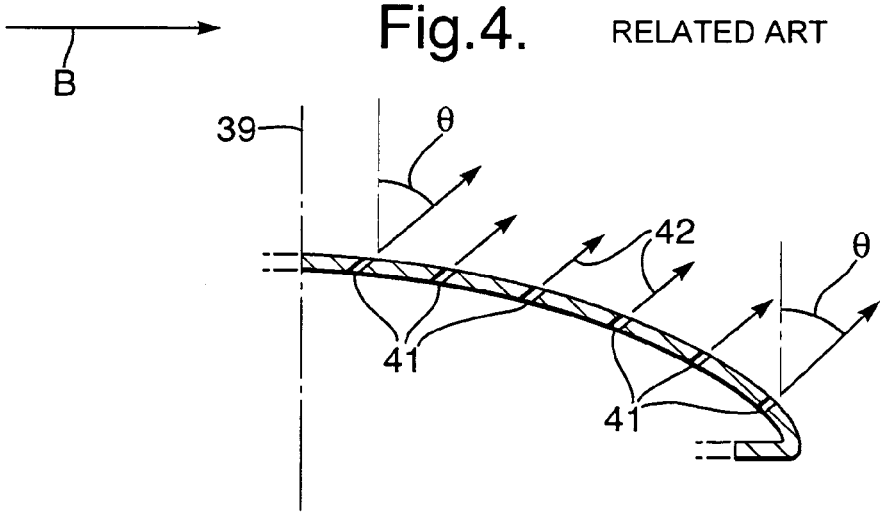
FIG. 4 is a part section through the prior art bleed valve in FIG. 4.

FIGS. 3 and 4 show a prior art diffuser 36 as described in the preamble. The diffuser 36 comprises a plurality of holes 41. Each hole 40 is radially aligned with respect to a centre-line 39 of the diffuser 36. This diffuser 36 comprises a number of zones, two of which are shown 37, 38, and each has an array of holes 41. Within each zone 37, 38 the holes 41 are also angled θ away from the centre-line 39. The angle θ may be between 5 and 65 degrees. It should be well noted, however, that all holes 41 are radially aligned from the centre-line, see arrows 42 indicating the individual radial plumes from each hole 41.

As mentioned in the preamble, it has been found that even these prior art diffusers 36 are not effective at mixing the hot bleed air with the cool bypass air because the individual flows 42 from each small hole 41 do not act independently as desired. Although each small gas stream or jet 42 is initially discrete and is directed in a slightly different direction, within a short distance they conglomerate into a single plume. This is because the main bypass flow B is unable to achieve significant penetration into the mass of individual plumes 42 and so a partial vacuum forms between them. This vacuum causes the individual plumes to turn until they are pointing in the same direction and thus forms a single plume entity, which is less easily mixed with the bypass flow B.

It is highly undesirable for the hot compressor bleed gases to impinge on the heat sensitive part of the TRU 29. Thus it is an object of the present invention to thoroughly mix the bleed air with the bypass flow before it impinges on the TRU 29.

Referring now to FIG. 5, where a bleed valve 30 comprises a diffuser 50 in accordance with a first embodiment of the present invention. The diffuser 50 comprises a plurality of holes 40 through which the bleed fluid flows 54 and into the fluid stream B passing through the bypass duct 22. All of the holes 40 are angled in a tangential direction and therefore impart a tangential velocity component to the bleed fluid flow 54. In this way the bleed fluid flow 54 from the diffuser 50 forms a vortex 55 or spiral. Due to the swirling bleed fluid flow in the vortex 55, the hotter bleed air is more readily able to mix with the bypass stream B. Therefore this improvement reduces the heat of or completely prevents hot bleed gasses from impinging on heat sensitive nacelle and other engine components.

The term 'tangential' is intended to relate to a centre-line of the rotating vortex 55 generated, which in the case of the FIG. 5 embodiment is also related to the centre-line of the diffuser 50.

Although it is preferred that all of the holes 40 are angled tangentially for maximum vortex generation, it should be appreciated that at least some of them are angled to generate a vortex 55. Furthermore, and depending upon a particular application the angled holes 40', 40" may be partly angled tangentially so impart the bleed flow with a component of velocity in the tangential direction as seen in FIG. 5a. Here the holes 40' are directed both tangentially and radially outwardly. This produces a weaker vortex 55, but one with a greater cross-sectional area or diameter. Similarly, the holes 40" are directed both tangentially and radially inwardly. This produces a stronger tighter vortex 55, but one with a smaller cross-sectional area.

In FIG. 6, the holes 40 may not necessarily all be angled with the same tangential angle, which further introduces irregularities in the vortex to further promote mixing with the bypass flow B. In this example, alternate quarters of the diffuser comprise holes 40' and 40", the combination of which creates a tighter inner vortex 55I and a looser vortex 55L. This arrangement gives the bypass stream B more opportunity to mix into the overall vortex 55. Still further the alternate quarters may comprise holes 40', 40" which are arranged to produce counter rotating vortices 55I and 55L.

In FIG. 7 all or at least some of the holes 40, 40', 40" have an upstream angular component α so that the vortex 55F is initially angled α into the bypass gas stream B. This enhances mixing between fluid flows as the bleed flow vortex 55F travels over a greater distance (than vortex 55G) through the bypass flow B, before impinging (if at all) on the opposite wall of the bypass duct 22 or blocker door 9.

In FIG. 5b, some or all of the generally circular cross-section holes 40 are substituted for slots 60 and may either be elliptical or as shown rectangular in cross-section.

Figure 8:
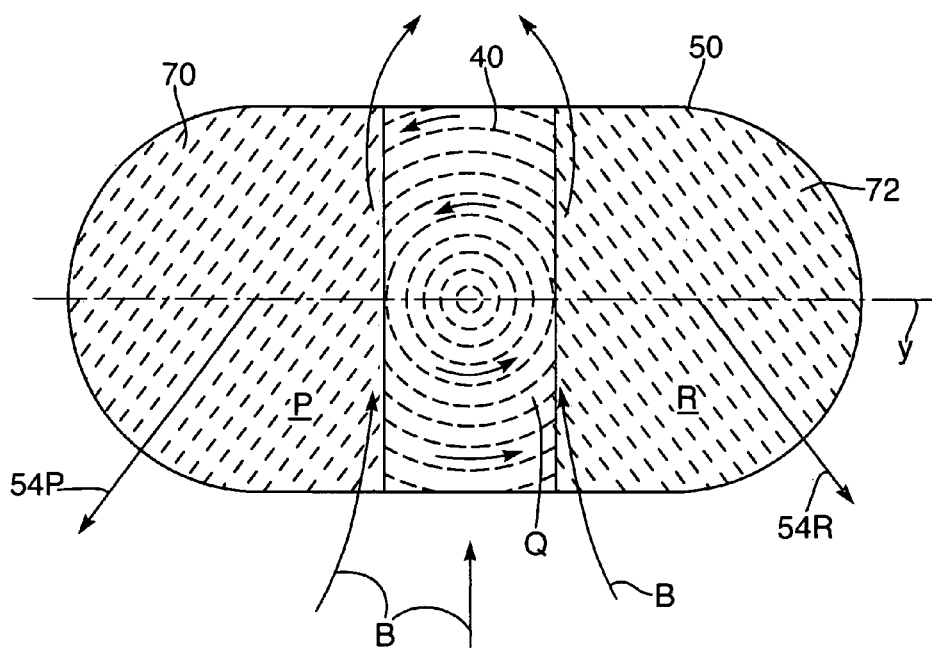
FIG. 8 shows a plan view of a second diffuser in accordance with the present invention.

In FIG. 8, a second embodiment of the present invention the diffuser 50 comprises a number of zones P, Q, R of holes. Zone Q comprises a plurality of holes 40, 40', 40" in accordance with the first embodiment, whereas zones P and R comprise pluralities of holes 70, 72 which are angled generally away from the diffuser 50, as in the prior art for example. The vortex-inducing zone Q helps to prevent the two bleed flows 54R and 54P from coalescing. Such coalescing would form a single larger bleed flow which is less easily mixed with and cooled by the bypass flow B. Here the bypass flow B penetrates through the vortex 55 separating the two bleed flows 54R and 54P, where they are then mixed out more readily.

The holes 70, 72 in zones P and R are angled generally away from the diffuser 50 at between 30-45 degrees with respect to a projected plane YZ and which in this example is normal to the bypass stream B flow direction. Preferably, the holes 70, 72 are also angled upstream into the bypass stream B between 5 and 65 degrees.

It is preferable that the holes (40, 40', 40") are angled anti-clockwise to produce an anti-clockwise rotating vortex that matches the swirl direction of the bypass airflow. Anti-clockwise is defined as about the Z-axis as seen for example in FIGS. 5 and 8. Preferably, each vortex generated is rotating in the same direction as the swirl direction of the bypass flow so that adjacent vortices do not coalesce with one another. Coalescence of vortices is undesirable as it would create a larger and plume which is more likely to impinge on heat sensitive parts.

Figure 9:
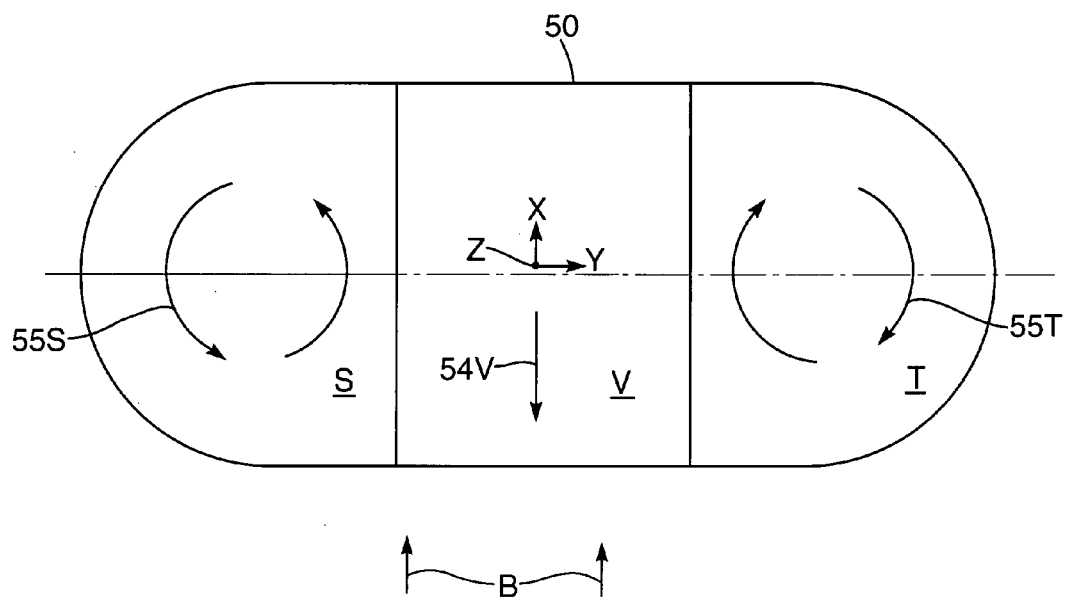
FIG. 9 shows a plan view of a third diffuser in accordance with the present invention.

In FIG. 9 a third embodiment comprises a middle zone V and outer zones S and T. The outer zones S and T generate counter rotating vortices 55S and 55T in accordance with the earlier teaching of the present invention, whilst zone V produces a non-rotating bleed plume 54V. The two vortices 55S and 55T rotate to disrupt and draw bypass air into the middle zone V to mix the hot and cool flows more effectively. The three zones are preferably aligned normal to the bypass stream B, but may be offset with the zone Q positioned upstream of zones P and R in a triangular formation.

Various embodiments may be made without departing from the scope of the invention. For example, although the diffuser 50 is shown as circular it may be any other shape such as oval, square, triangular or rectangular. Note that although the term tangential has been used while describing the direction of holes in the circular diffuser of the first embodiment, the term equally applied to other shaped diffusers as the term may be used with reference to a centre-line of the vortex generated.

It should be appreciated that although the bypass airflow B is shown as flowing in a generally parallel direction with respect the engine's rotational axis 11, the bypass air flow may spiral or swirl down the bypass duct 22. Therefore in some situations the diffusers 50 of FIGS. 8 and 9 may be orientated with respect to the angle of the impinging bypass airflow B rather than with the engine's centre-line 11.

It is also possible to discharge the bleed flows into the core engine or to ambient rather than the bypass duct 22. Where discharged into the core engine the bleed flow might act as a coolant flow and therefore enhance distribution of coolant flow. Where discharged into ambient the vortex would aid rapid mixing and reduce mixing noise of the fluid streams.

I claim:

1. A bleed valve for a gas turbine engine, the bleed valve comprising:
   a diffuser forming a plurality of holes through which a bleed fluid flows and into a fluid stream, wherein at least some of the plurality holes are at least partially circumferentially angled relative to a face of the diffuser so that bleed air forms a vortex to enhance mixing with the fluid stream.

2. The bleed valve as claimed in claim 1 wherein all the plurality of holes are at least partially circumferentially angled.

3. The bleed valve as claimed in claim 1 wherein the plurality of holes are also angled radially outwardly to produce a loose vortex.

4. The bleed valve as claimed in claim 1 wherein the plurality of holes are also angled radially inwardly to produce a tight vortex.

5. The bleed valve as claimed in claim 1 wherein the diffuser comprises at least two zones wherein one zone comprises the plurality of holes that create the vortex and another zone comprises a plurality of holes that do not create a vortex.

6. The bleed valve as claimed in claim 5 wherein the diffuser comprises three zones, the vortex-creating zone being positioned generally between the other zones.

7. The bleed valve as claimed in claim 5 wherein the diffuser comprises three zones, two of which are vortex-creating zones and are positioned on either side of the other zone.

8. The bleed valve as claimed in claim 1 wherein three zones are aligned substantially normal to the direction of fluid stream.

9. The bleed valve as claimed in claim 1 wherein the plurality of holes are also angled upstream into the fluid stream to give the vortex or other bleed plume an upstream velocity component.

10. The bleed valve as claimed in claim 1 wherein the plurality of holes are angled in a vortex that rotates in the same direction as any swirl in the fluid stream.

11. The bleed valve as claimed in claim 7 wherein the plurality of holes of one of the vortex-creating zones are angled anti-clockwise and the other clockwise to produce corresponding and oppositely rotating vortices.

12. The bleed valve as claimed in claim 1 wherein the plurality of holes are configured in any one of the group of shapes comprising a circle, an ellipse or a rectangle.

13. A gas turbine engine comprising:
   an airflow duct;
   a compressor; and
   a bleed valve arranged to bleed air from the compressor into the airflow duct, wherein the bleed valve further comprises
      a diffuser, forming a plurality of holes through which a bleed fluid flows and into a fluid stream, wherein at least some of the plurality holes are at least partially circumferentially angled relative to a face of the diffuser so that bleed air forms a vortex to enhance mixing with the fluid stream.

* * * * *